United States Patent [19]

Greenwood et al.

[11] Patent Number: 5,171,848

[45] Date of Patent: Dec. 15, 1992

[54] SALTS OF BLACK TRISAZO DYES WITH ALKYL AMINES HAVING GOOD SOLUBILITY IN ORGANIC LIQUIDS

[75] Inventors: David Greenwood, Oldham; Peter Gregory, Bolton; John E. Presgrave, Todmorden, all of England

[73] Assignee: Imperial Chemical Industries PLC, London, England

[21] Appl. No.: 860,564

[22] Filed: Mar. 30, 1992

Related U.S. Application Data

[63] Continuation of Ser. No. 540,202, Jun. 19, 1990, abandoned.

[30] Foreign Application Priority Data

Jul. 12, 1989 [GB] United Kingdom ............... 8915960

[51] Int. Cl.$^5$ ................ C09B 33/22; C09B 67/22; C09D 11/02
[52] U.S. Cl. ............................ 534/680; 534/573; 534/678; 534/685; 534/728; 534/810; 534/815; 106/22 E; 106/22 K; 8/639
[58] Field of Search ................ 534/573 M, 678, 728, 534/810, 815, 680; 106/22; 8/639

[56] References Cited

U.S. PATENT DOCUMENTS

| | | | |
|---|---|---|---|
| 4,443,371 | 4/1984 | Brulard et al. | 534/728 X |
| 4,479,906 | 10/1984 | Zeidler et al. | 534/685 X |
| 4,485,042 | 11/1984 | Armbrecht et al. | 534/810 X |
| 4,557,761 | 10/1985 | Kobayashi et al. | 534/728 X |
| 4,734,489 | 3/1988 | Kawasaki et al. | 534/810 X |
| 4,767,459 | 8/1988 | Greenwood et al. | 534/815 X |
| 4,824,948 | 4/1989 | Stark et al. | 540/125 |
| 5,026,425 | 6/1991 | Hindagolla et al. | 106/22 |

FOREIGN PATENT DOCUMENTS

| | | |
|---|---|---|
| 0005222 | 11/1979 | European Pat. Off. |
| 62304 | 10/1982 | European Pat. Off. ............ 534/728 |
| 0212345 | 3/1987 | European Pat. Off. |
| 2009830 | 2/1970 | France |

OTHER PUBLICATIONS

Ricoh, Chemical Abstracts, vol. 100, No. 176668W (1984).

Primary Examiner—Mary C. Lee
Assistant Examiner—Fiona T. Powers
Attorney, Agent, or Firm—Cushman, Darby & Cushman

[57] ABSTRACT

Black compounds of Formula (1) having enhanced solubility in polar organic liquids which are useful as ink colorants in conventional and hot melt ink-jet printing and automatic identification, as black colorants for toners and thermal wax transfer sheets and as charge control agents for electrophotographic toners;

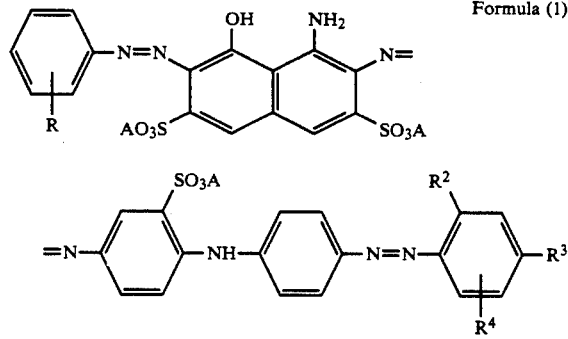

Formula (1)

wherein
R is H, $C_{1-4}$alkyl, $C_{1-4}$alkoxy, aryl, $C_{4-8}$cycloalkyl, —CN, —NO$_2$, halogen, —COOR$^1$, —OH, —SH or —SO$_3$A;
R$^1$ is A, $C_{1-4}$-alkyl or aryl;
R$^2$ is —NH$_2$, —OH or —SO$_3$A;
R$^3$ is —NH$_2$ or —OH;
R$^4$ is —NH$_2$, —OH, —SO$_3$A or H; and
A is NQ$_4$ in which at least one Q is a branched chain fatty $C_{6-20}$-aliphatic group.

6 Claims, No Drawings

SALTS OF BLACK TRISAZO DYES WITH ALKYL AMINES HAVING GOOD SOLUBILITY IN ORGANIC LIQUIDS

This is a continuation of application Ser. No. 540,202, filed on Jun. 19, 1990, which is abandoned.

This specification describes an invention relating to a salt of a direct black dye with an amine, having enhanced solubility in certain polar organic liquids, and its use in inks for conventional and hot melt ink-jet printing and automatic identification (AI), as a black colorant for toners and thermal wax transfer sheets and as a charge control agent (CCA) for electrophotographic toners.

According to the present invention there is provided a compound or mixture of compounds of the Formula (1):

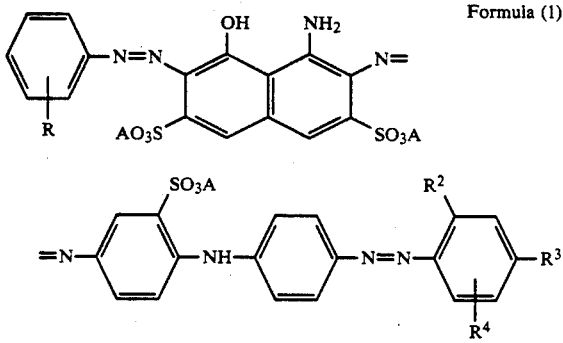

wherein
R is H, $C_{1-4}$-alkyl, $C_{1-4}$-alkoxy, aryl, $C_{4-8}$-cycloalkyl, —CN, —NO$_2$, halogen, —COOR$^1$, —OH, —SH or —SO$_3$A;
R$^1$ is A, $C_{1-4}$-alkyl or aryl;
R$^2$ is —NH$_2$, —OH or —SO$_3$A;
R$^3$ is —NH$_2$ or —OH;
R$^4$ is —NH$_2$, —OH, —SO$_3$A or H; and
A represents a substituted ammonium group carrying at least one branched chain fatty $C_{6-20}$-aliphatic group.

The substituted ammonium group, A, is preferably of the formula:

NQ$_4$ in which at least one Q is a branched chain fatty $C_{6-20}$-aliphatic group. It is further preferred that two or three Qs, each independently represents H, $C_{1-4}$-alkyl, phenyl or benzyl. It is especially preferred that at least one, and more preferably three, of the groups represented by Q is H.

The fatty aliphatic group represented by Q preferably contains from 6 to 12, more preferably from 8 to 11, and especially preferably 8 to 10, carbon atoms. Preferred fatty aliphatic groups are alkyl and alkenyl and more especially such groups in which the carbon chain contains at least one branch and more especially from 2 to 4 branches. Preferred alkyl groups, represented by Q, containing 8 or 9 carbon atoms, are 3,5,5-trimethylhexyl, 1,1,3,3-tetramethylbutyl and 2-ethylhexyl. Examples of other aliphatic chains are 1-ethyl-3-methylpentyl, 1,5-dimethylhexyl, 1-methylheptyl, 1,4-dimethylheptyl, 1,2,2-trimethylpropyl, 2-ethylbutyl, 1-propylbutyl, 1,2-dimethylbutyl, 2-methylpentyl, 1-ethylpentyl, 1,4-dimethylpentyl, 1-methylhexyl, 3-methylhexyl, 1,3,3-trimethylbutyl, 1-methylnonyl. The substituted ammonium preferably carries one fatty alkyl group as described above the remaining groups being preferably H, $C_{1-4}$-alkyl, especially, methyl. It is, however, preferred that at least one, and more preferably all three, of the remaining groups represented by Q is H. Suitable ammonium groups are 2-ethylhexyl-ammonium, 1,1,3,3-tetramethylbutyl-ammonium, 3,5,5-trimethylhexyl-ammonium and 1-methylheptyl-ammonium.

It is preferred that in dyes of Formula (1) R is —H, R$^2$ is —NH$_2$, R$^3$ is —OH and R$^4$ is —H or R is —H, R$^2$ is —OH, R$^3$ is —NH$_2$ and R$^4$ is —H and mixtures of these two isomeric dyes are especially preferred.

The amine salts of the present invention are conveniently prepared by mixing an aqueous solution of an alkali metal salt, preferably the sodium salt, of the compound of Formula (1) with an aqueous solution of the amine salt, preferably the hydrochloride, to cause precipitation of the amine salt of the compound of Formula (1).

The compound of Formula (1) has generally good solubility in polar organic media, especially lower alkanols, such as methanol, ethanol and n-propanol, and glycols especially $C_{2-4}$-glycols, such as ethylene glycol, diethylene glycol and propylene glycol, and is particularly suitable for the preparation of inks in such media, especially inks for use in ink-jet printing equipment.

Two or more different amines may be used to prepare mixed amine salts, such salts generally having higher solubility and greater solution stability.

The invention is further illustrated by the following examples in which all parts and percentages are by weight unless otherwise indicated.

EXAMPLE 1

A mixture of 48.5 parts of 1,1,3,3-tetramethylbutylamine and 300 parts of distilled water was neutralised to pH 7.0 by the addition of concentrated hydrochloric acid. 112.4 parts of CI Direct Black 168 was added to 1500 parts of distilled water and the pH adjusted to 7.0 by addition of aqueous sodium hydroxide solution. The solution was warmed to 45°–50° C. and the above amine hydrochloride solution added dropwise with stirring over 15 minutes and then stirred for a further 30 minutes at 45°–50° C. The product was isolated by filtration, washed with distilled water and dried.

At 25° C. the product was readily soluble in ethanol (10% wt/vol), n-propanol (10% wt/vol) but almost insoluble in water (<0.5% wt/vol).

EXAMPLE 2

This was prepared using the procedure for Example 1 except that 54 parts of 3,5,5-trimethylhexylamine were used in place of the 1,1,3,3-tetramethylbutylamine.

At 25° C the product was readily soluble in ethanol (15% wt/vol), n-propanol (10% wt/vol) but almost insoluble in water.

EXAMPLE 3

This was prepared using the procedure for Example 1 except that 48.5 parts of 2-ethylhexylamine were used in place of the 1,1,3,3-tetramethylbutylamine.

At 25° C. the product was readily soluble in ethanol (10% wt/vol), n-propanol (4% wt/vol) but almost insoluble in water (<0.5% wt/vol).

EXAMPLE 4

In place of the 48.5 parts of 1,1,3,3-tetramethylbutylamine used in Example 1 there was used 48.5 parts of 1,5-dimethylhexylamine. The product was soluble in methanol, ethanol and n-propanol.

EXAMPLE 5

In place of the 112.4 parts of CI Direct Black 168 used in Example 2 there was used 112.4 parts of 1-amino-2-(4-[4-(2,4-diaminophenylazo)phenylamino]-3-sulphophenylazo)-3,6-disulpho-8-hydroxy-7-phenylazonaphthalene. The product dissolved in methanol, ethanol and n-propanol.

EXAMPLE 6

In place of the 112.4 parts of CI Direct Black 168 used in Example 2 there was used 125 parts of 1-amino-2-(4-[4-(2,4-diamino-5-sulphophenylazo)phenylamino]-3-sulphophenylazo)-3,6-disulpho-8-hydroxy-7-phenylazonaphthalene and in place of the 54 parts of 3,5,5-trimethylhexylamine there was used 72 parts. The product was soluble in methanol, ethanol and n-propanol.

EXAMPLE 7

In place of the 112.4 parts of CI Direct Black 168 used in Example 2 there was used 114.2 parts of a mixture of 1-amino-2-(4-[4-(4-amino-2-hydroxyphenylazo)-phenylamino]-3-sulphophenylazo)-3,6-disulpho-8-hydroxy-7-(4-methylphenylazo)-naphthalene and 1-amino-2-(4-[4-(2-amino-4-hydroxyphenylazo)-phenylamino]-3-sulphophenylazo)-3,6-disulpho-8-hydroxy-7-(4-methylphenylazo)-naphthalene. The product dissolved in methanol, ethanol and n-propanol.

EXAMPLE 8

In place of the 112.4 parts of CI Direct Black 168 used in Example 2 there was used 116.2 parts of a mixture of 1-amino-2-(4-[4-(4-amino-2-hydroxyphenylazo)-phenylamino]-3-sulphophenylazo)-3,6-disulpho-8-hydroxy-7-(3-methoxyphenylazo)-naphthalene and 1-amino-2-(4-[4-(2-amino-4-hydroxyphenylazo)-phenylamino]-3-sulphophenylazo)-3,6-disulpho-8-hydroxy-7-(3-methoxyphenylazo)-naphthalene. The product dissolved in methanol, ethanol and n-propanol.

EXAMPLE 9

In place of the 112.4 parts of CI Direct Black 168 used in Example 2 there was used 118 parts of a mixture of 1-amino-2-(4-[4-(4-amino-2-hydroxyphenylazo)-phenylamino]-3-sulphophenylazo)-3,6-disulpho-8-hydroxy-7-(4-nitrophenylazo)-naphthalene and 1-amino-2-(4-[4-(2-amino-4-hydroxyphenylazo)-phenylamino]-3-sulphophenylazo)-3,6-disulpho-8-hydroxy-7-(4-nitrophenylazo)-naphthalene. The product was soluble in methanol, ethanol and n-propanol.

EXAMPLE 10

In place of the 112.4 parts of CI Direct Black 168 used in Example 2 there was used 116.7 parts of a mixture of 1-amino-2-(4-[4-(4-amino-2-hydroxyphenylazo)-phenylamino]-3-sulphophenylazo)-3,6-disulpho-8-hydroxy-7-(4-chlorophenylazo)-naphthalene and 1-amino-2-(4-[4-(2-amino-4-hydroxyphenylazo)-phenylamino]-3-sulphophenylazo)-3,6-disulpho-8-hydroxy-7-(4-chlorophenylazo)-naphthalene. The product was soluble in methanol, ethanol and n-propanol.

EXAMPLE 11

In place of the 112.4 parts of CI Direct Black 168 used in Example 2 there was used 125 parts of a mixture of 1-amino-2-(4-[4-(4-amino-2-hydroxyphenylazo)-phenylamino]-3-sulphophenylazo)-3,6-disulpho-8-hydroxy-7-(4-sulphophenylazo)-naphthalene and 1-amino-2-(4-[4-(2-amino-4-hydroxyphenylazo)-phenylamino]-3-sulphophenylazo)-3,6-disulpho-8-hydroxy-7-(4-sulphophenylazo)-naphthalene and in place of the 54 parts of 3,5,5-trimethylhexylamine there was used 72 parts. The product was soluble in methanol, ethanol and n-propanol.

EXAMPLE 12

In place of the 112.4 parts of CI Direct Black 168 used in Example 2 there was used 117.9 parts of a mixture of 1-amino-2-(4-[4-(4-amino-2-hydroxyphenylazo)-phenylamino]-3-sulphophenylazo)-3,6-disulpho-8-hydroxy-7-(3-carboxyphenylazo)-naphthalene and 1-amino-2-(4-[4-(2-amino-4-hydroxyphenylazo)-phenylamino]-3-sulphophenylazo)-3,6-disulpho-8-hydroxy-7-(3-carboxyphenylazo)-naphthalene and in place of the 54 parts of 3,5,5-trimethylhexylamine there was used 72 parts. The product was soluble in methanol, ethanol and n-propanol.

EXAMPLE 13

In place of the 48.5 parts of 1,1,3,3-tetramethylbutylamine used in Example 1 there was used 48.5 parts of 1-methylheptylamine. The product was soluble in methanol, ethanol and n-propanol.

EXAMPLE 14

In place of the 112.4 parts of CI Direct Black 168 used in Example 2 there was used 112.4 parts of 1-amino-2-(4-[4-(2,4-dihydroxyphenylazo)phenylamino]-3-sulphophenylazo)-3,6-disulpho-8-hydroxy-7-phenylazonaphthalene. The product was soluble in methanol, ethanol and n-propanol.

EXAMPLE 15

In place of the 112.4 parts of CI Direct Black 168 used in Example 2 there can be used 122.5 parts of a mixture of 1-amino-2-(4-[4-(4-amino-2-hydroxyphenylazo)phenylamino]-3-sulphophenylazo)-3,6-disulpho-8-hydroxy-7-(4-cyclohexylphenylazo)-naphthalene and 1-amino-2-(4-[4-(2-amino-4-hydroxyphenylazo)-phenylamino]-3-sulphophenylazo)-3,6-disulpho-8-hydroxy-7-(4-cyclohexylphenylazo)-naphthalene.

EXAMPLE 16

In place of the 112.4 parts of CI Direct Black 168 used in Example 2 there can be used 115.5 parts of a mixture of 1-amino-2-(4-[4-(4-amino-2-hydroxyphenylazo)phenylamino]-3-sulphophenylazo)-3,6-disulpho-8-hydroxy-7-(4-cyanophenylazo)-naphthalene and 1-amino-2-(4-[4-(2-amino-4-hydroxyphenylazo)-phenylamino]-3-sulphophenylazo)-3,6-disulpho-8-hydroxy-7-(4-cyanophenylazo)-naphthalene.

EXAMPLE 17

In place of the 112.4 parts of CI Direct Black 168 used in Example 2 there can be used 114.4 parts of a mixture of 1-amino-2-(4-[4-(4-amino-2-hydroxyphenylazo)phenylamino]-3-sulphophenylazo)-3,6-disulpho-8-hydroxy-7-(4-hydroxyphenylazo)-naphthalene and 1-amino-2-(4-[4-(2-amino-4-hydroxyphenylazo)-phenylamino]-3-sulphophenylazo)-3,6-disulpho-8-hydroxy-7-(4-hydroxyphenylazo)-naphthalene.

EXAMPLE 18

In place of the 112.4 parts of CI Direct Black 168 used in Example 2 there can be used 116.3 parts of a mixture of 1-amino-2-(4-[4-(4-amino-2-hydroxyphenylazo)phenylamino]-3-sulphophenylazo)-3,6-disulpho-8-hydroxy-7-(4-mercaptophenylazo)-naphthalene and 1-amino-2-(4-[4-(2-amino-4-hydroxyphenylazo)-phenylamino]-3-sulphophenylazo)-3,6-disulpho-8-hydroxy-7-(4-mercaptophenylazo)-naphthalene.

EXAMPLE 19

In place of the 112.4 parts of CI Direct Black 168 used in Example 2 there can be used 119.5 parts of a mixture of 1-amino-2-(4-[4-(4-amino-2-hydroxyphenylazo)phenylamino]-3-sulphophenylazo)-3,6-disulpho-8-hydroxy-7-(4-methoxycarbonylphenylazo)-naphthalene and 1-amino-2-(4-[4-(2-amino-4-hydroxyphenylazo)phenylamino]-3-sulphophenylazo)-3,6-disulpho-8-hydroxy-7-(4-methoxycarbonylphenylazo)naphthalene.

EXAMPLE 20

In place of the 112.4 parts of CI Direct Black 168 used in Example 2 there can be used 121.8 parts of a mixture of 1-amino-2-(4-[4-(4-amino-2-hydroxyphenylazo)phenylamino]-3-sulphophenylazo)-3,6-disulpho-8-hydroxy-7-(4-biphenylazo)-naphthalene and 1-amino-2-(4-[4-(2-amino-4-hydroxyphenylazo)-phenylamino]-3-sulphophenylazo)-3,6-disulpho-8-hydroxy-7-(4-biphenylazo)-naphthalene.

We claim:

1. A compound of Formula (1):

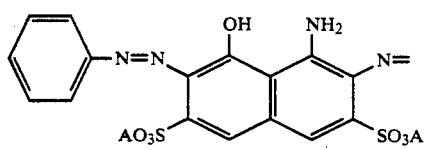

Formula (1)

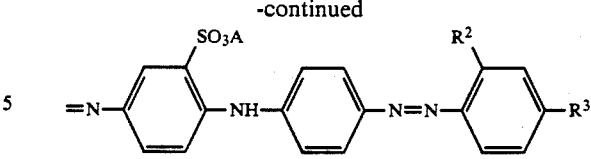

wherein
$R^2$ is —$NH_2$ and $R^3$ is —OH; or
$R^3$ is —$NH_2$ and $R^2$ is —OH; and
A is $NH_3Q$ in which Q is a branched chain fatty $C_{8-10}$-aliphatic group.

2. A compound according to claim 1 wherein Q is 3,5,5-trimethylhexyl, 1,1,3,3-tetramethylbutyl, 2-ethylhexyl, 1-ethyl-3-methylpentyl, 1,5-dimethylhexyl, 1-methylheptyl, 1,4-dimelthylheptyl or 1-methylnonyl.

3. A compound according to claim 1 wherein Q is 3,5,5-trimethylhexyl.

4. A composition comprising a compound of Formula (1) in which $R^2$ is —OH and $R^3$ is —$NH_2$ and a compound of Formula (1) in which $R^2$ is —$NH_2$ and $R^3$ is —OH:

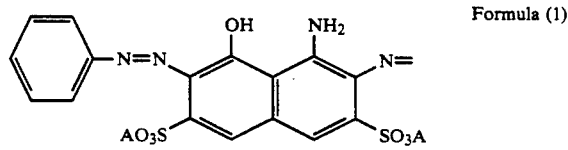

Formula (1)

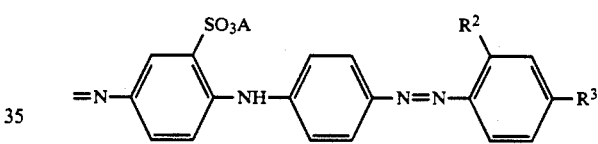

wherein
A is $NH_3Q$; and
Q is a branched chain fatty $C_{8-10}$-aliphatic group.

5. A composition according to claim 4 wherein Q is 3,5,5-trimethylhexyl, 1,1,3,3-tetramethylbutyl, 2-ethylhexyl, 1-ethyl-3-methylpentyl, 1,5-dimethylhexyl, 1-methylheptyl, 1,4-dimethylheptyl or 1-methylnonyl.

6. A composition according to claim 5 wherein Q is 3,5,5-trimethylhexyl.

* * * * *